United States Patent Office 3,155,503
Patented Nov. 3, 1964

3,155,503
ELECTROPHOTOGRAPHIC MATERIAL
Paul Maria Cassiers, Mortsel-Antwerp, and René Maurice Hart, Wilrijk-Antwerp, Belgium, assignors to Gevaert Photo-Producten N.V., Mortsel, Belgium, a Belgian company
No Drawing. Filed Feb. 26, 1960, Ser. No. 11,129
Claims priority, application Great Britain Feb. 26, 1959
1 Claim. (Cl. 96—1)

The present invention relates to an electrophotographic material, and more particularly to an electrophotographic material consisting of a support and a photoconductive layer which contains an organic polymeric photoconductive substance or which consists of an organic polymeric photoconductive substance.

Electrophotographic materials are already known which consist of a support and a photoconductive layer containing as photoconductor an inorganic substance such as selenium or zinc oxide or an organic substance such as anthracene, benzidine or a heterocyclic compound of a determined type.

Now we have found that electrophotographic material with particularly favorable properties and suitable to be used in the application of the most widely varying electrophotographic reproduction methods is obtained if in the manufacture of the photoconductive layer polymeric compounds are used containing or consisting of recurring groups corresponding to the general formula:

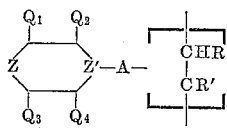

wherein:

A represents a single bond, or a divalent organic radical such as, e.g., $-CH_2-$, $-CO-$, $-O-CO-$, $-CH_2-CH_2-COO-$, $-CH_2-CHCH_3-O-CO-$, $-CH_2-CH_2-CO-C_6H_4-$, $-CH_2-C_6H_4$,
R and R' each represents a hydrogen atom or a lower alkyl radical such as, e.g., a methyl radical,
Z represents a sulphur atom or a single bond,
Z' represents a methine group or a nitrogen atom,
$Q_1$ and $Q_2$ together represent the atoms necessary to complete an aromatic nucleus, and
$Q_3$ and $Q_4$ together represent the atoms necessary to complete an aromatic nucleus.

A representative although not limitative list of vinyl polymers or copolymers containing or consisting of recurring groups corresponding to the above general formula, and suitable in the manufacture of the electrophotographic material according to the present invention, is given below.

A. Vinyl polymers:
  Poly(9-methacrylyloxyfluorene)
  Poly(N-acrylylphenothiazine)
  Poly[N-(β-acrylyloxy-ethyl)-phenothiazine]
  Poly[N-(2-acrylyloxy propyl)-phenothiazine]
  Poly(N-allylcarbazole)
  Poly(N-2-acrylyloxy-2-methyl-N-ethyl carbazole)
  Poly[N-(2-p-vinylbenzoylethyl)-carbazole]
  Poly(N-propenylcarbazole)
  Poly(N-vinylcarbazole)
  Poly(N-2-methacrylyloxypropyl)carbazole
  Poly-[N-(acrylyl)-carbazole]
  Poly-[4-vinyl-d-(N-carbazyl)-toluene]

B. Vinyl copolymers, more especially vinyl copolymers containing vinyl carbazole units:

| | Mol percent of N-vinylcarbazole |
|---|---|
| Copolymer of N-vinylcarbazole and vinylidene chloride | 85.4 |
| Copolymer of N-vinylcarbazole and 3,3',5-trimethyl isononylether | 93 |
| Copolymer of N-vinylcarbazole and vinyl acetate | 88.6 |
| Copolymer of N-vinylcarbazole and isopropenyl acetate | 94.5 |
| Copolymer of N-vinylcarbazole and vinylstearate | 37.5 |
| Copolymer of N-vinylcarbazole and methylacrylate | 67.6 |
| Copolymer of N-vinylcarbazole and ethylacrylate | 41 |
| Graft copolymer of N-vinylcarbazole and poly(ethyl-acrylate) | 90.3 |
| Emulsion polymer of N-vinylcarbazole and ethylacrylate | 94.5 |
| Copolymer of N-vinylcarbazole and n-butylacrylate | 58.3 |
| Copolymer of N-vinylcarbazole and 2-ethylhexyl-acrylate | 51.6 |
| Copolymer of N-vinylcarbazole and acrylyloxyethyldiethylamine | 76.6 |
| Copolymer of N-vinylcarbazole and vinylcinnamate | 92.5 |
| Copolymer of N-vinylcarbazole and methylmethacrylate | 62.7 |
| Copolymer of N-vinylcarbazole and isobutyl methacrylate | 51.8 |
| Copolymer of N-vinylcarbazole and laurylmethacrylate | 77.4 |
| Copolymer of N-vinylcarbazole and methacryl-yloxyethyl diethylamine | 9.7 |
| Copolymer of N-vinylcarbazole and acylonitrile graft copolymer of N-vinylcarbazole and butyaldehyde acetal of polyvinylalcohol | 88 |
| Copolymer of N-vinylcarbazole and di(2-chloroethyl)-vinylphosphonate | 82.4 |
| Copolymer of N-vinylcarbazole and styrene | 49 |
| Graft copolymer of N-vinylcarbazole and polystyrene | 27.3 |
| Copolymer of N-vinylcarbazole and vinylnaphthalene | 47.1 |
| Copolymer of N-vinylcarbazole and anthracene-(9,10) | 91.5 |
| Copolymer of N-vinylcarbazole and 2-vinylpyridine | 31.8 |
| Copolymer of N-vinylcarbazole and 4-vinylpyridine | 32.4 |
| Copolymer of N-vinylcarbazole and N-vinylpyrrolidone | 69.1 |
| Terpolymer of N-vinylcarbazole, acrylonitrile and styrene | 20 |
| Graft copolymer of a terpolymer of vinyl chloride, vinyl acetate and vinyl alcohol with N-vinylcarbazole | 29.4 |
| Graft copolymer of a terpolymer of vinyl chloride, vinyl acetate and maleic anhydride with N-vinylcarbazole | 55.1 |

The vinyl polymers and copolymers listed hereinbefore can be prepared by application of one of the various known polymerization procedures, e.g., by pearl- or emulsion polymerization or by polymerization in solution, whereby the initiation of the polymerization can occur by free radicals, by ion formation, or by radiation, e.g., with actinic light. It is to be noted that the polymerization degree is not critical and can vary between wide limits. As far as the copolymers are concerned, it is further to be noted that the content of groups corresponding to the general formula given hereinbefore is not critical and, as shown in the above list of N-vinylcarbazole units containing copolymers, can vary between 10 and 95%, taking into account the properties of the compounds used in the preparation of the copolymers and the required electro-photographic and/or mechanical properties. The best results are attained with a content of vinylcarbazole units between 40 and 90%.

The preparation of some of the polymers and copolymers listed above is described hereinafter by way of example; the polymers and copolymers can be prepared in an analogous manner by application of polymerization techniques generally known to those skilled in the art.

(1) *Preparation of Poly(N-Allylcarbazole) by Polymerization in Solution, the Polymerization Being Initiated by Free Radicals*

N-allylcarbazole synthetized according to Levy, Monatsh. Chemie 33 (1911), 182, and with a melting point of 57–58° C. is polymerized by heating for 30 h. at 140° C. in the presence of 4% tert-butylperoxide. The polymer obtained is isolated by precipitation in hexane, and purified by dissolution in methylene chloride and precipitation in hexane.

(2) *Preparation of Poly(N-Propenylcarbazole) by Polymerization in Solution, the Polymerization Being Initiated by Ion-Formation*

Sodium amide is obtained by mixing in a 10 litre flask: 5 l. of anhydrous liquid ammonia, 115 g. of sodium metal cut in small pieces and about 1 g. of finely divided $Fe(NO_3)_3.9H_2O$ as a catalyst for the synthesis, according to A. I. Vogel, Practical Organic Synthesis, 3rd edition, 1956, p. 197. Thereafter, 855 g. of carbazole are added and the ammonia is evaporated whilst 3750 cm.³ of anhydrous toluene are dropwise added. This mixture is refluxed for 2 h., cooled to room temperature and a solution of 675 cm.³ of propylene oxide in 1250 cm.³ of toluene is dropwise added. This new mixture is refluxed for another 2 h., cooled and poured out into about 5 l. of ice water. The reaction mixture separates into 2 liquid layers, the inferior one containing the crystalline β-hydroxypropylcarbazole formed. After standing overnight, the melting point of the separated β-hydroxypropylcarbazole is 120–121° C. This product is again washed with water until neutral reaction of the wash-water, re-crystallized from a mixture consisting of 2500 cm.³ of ethanol and 600 cm.³ of water and dried overnight in a ventilated drying oven at 110° C.

In a reaction vessel of 5 l. a mixture of 1350 g. of phosphor-pentoxide and 1350 g. of anhydrous benzene is heated to reflux temperature. A warm solution of 270 g. of β-hydroxypropylcarbazole, prepared as above in 1350 cm.³ of anhydrous benzene, is added over a period of ¼ h. The blue-greenish paste obtained is refluxed for 1½ h. The reaction mixture is cooled to room temperature and poured out into an excess of hexane. The precipitate formed is filtered off and dried. This dry powder is poured out into water whilst stirring and the aqueous suspension obtained is slightly alkalized with sodium hydroxide. After stirring for 1 h., the precipitate is sucked off and washed with water and methanol. This precipitate, consisting mainly of poly(N-propenylcarbazole), is purified by dissolving in benzene, filtering and precipitating in methanol.

(3) *Preparation of Poly(N-Vinylcarbazole)*

(a) BY EMULSION POLYMERIZATION, THE POLYMERIZATION BEING INITIATED BY FREE RADICALS

To 100 cm.³ of water at 90° C., 30 g. of N-vinylcarbazole is added under stirring whilst nitrogen is passed through. Successively 2.5 g. of Adjupon, white powder consisting of 35–40% of active lauryl sodium sulphate; composition data from Sisley, T. P., "Index des huiles sulfonées et detergents modernes," tome I, page 396, tome II, page 389, Ed. Teintex, Paris II, France, and 0.15 g. of potassium persulphate are added. The temperature of the reaction mixture rises spontaneously and at the end of the exothermic reaction the mixture is kept at 97° C. for 3 h. After cooling, the emulsion obtained is filtered.

(b) BY POLYMERIZATION IN SOLUTION, THE POLYMERIZATION BEING INITIATED BY ION-FORMATION (1) *With phosphor-pentoxide as catalyst.*—To a solution of 30 g. of N-vinylcarbazole in 75 cm.³ of benzene is added gradually and whilst stirring 45 g. of phosphor-pentoxide. This reaction mixture is stirred for 4 h. at 70° C. and then poured out into hexane. The precipitate formed is filtered off, dried and gradually brought into water. This mixture is then slightly alkalized with sodium hydroxide. The poly(N-vinylcarbazole) formed is filtered off, washed with water, dried and purified by dissolving in methylene chloride, filtering and precipitating in acetone.

C, percent calculated, 87.05; found, 85.9.
N, percent calculated, 7.25; found, 7.07.

(2) *With sulphuric acid as catalyst.* To a solution of 20 g. of N-vinylcarbazole in 100 cm.³ of toluene, cooled down to —5° C., is added dropwise whilst thoroughly stirring a solution of 5 cm.³ of suspended acid in 20 cm.³ of toluene. The temperature at once rises to 35° C. After cooling to —5° C. and stirring for 1 h. at this temperature, further 50 cm.³ of toluene are added to the reaction mixture, which is then stirred for another 2 h. The blue viscous solution obtained is poured out into hexane whereafter the precipitate formed is dried, washed with water and dried under vacuum. The polymer is then purified by dissolving in benzene, filtering and precipitating in methanol. Yield: 8 g.

(4) *Preparation of the Copolymer of Eythlacrylate and N-vinylcarbazole*

(a) BY EMULSION POLYMERIZATION, THE POLYMERIZATION BEING INITIATED BY FREE RADICALS

A solution of 2 g. of Adjupon a white powder consisting of 35–40% of active lauryl sodium sulphate, described hereinbefore, in 100 cm.³ of water is heated whilst stirring at 70° C. and whilst nitrogen is passed through. To this solution are added 35. 7 g. of vinyl carbazole and 4.6 g. of ethylacrylate, and subsequently 400 mg. of potassium persulphate. The temperature rises up to 80° C. and then the solution is cooled down to 70° C. After the exothermic phase, the solution is again heated up to 75° C. for 2½ h. The obtained emulsion is broken by addition of 130 cm.³ of acetone and the formed precipitate is washed with water and methanol, and dried. N, percent found; 6.5, i.e., 89.7 mol percent of N-vinylcarbazole.

(b) BY SOLUTION POLYMERIZATION, THE POLYMERIZATION BEING INITIATED BY FREE RADICALS

A solution of 29.74 g. of N-vinylcarbazole, 6.26 g. of ethylacrylate, 200 mg. of azo-bis-isobutyronitrile and 160 cm.³ of thiophene free benzene is heated for 8 h. under nitrogen atmosphere at 80° C. After dilution with methylene chloride and precipitation in methanol, 34.3 g. of polymer is isolated. The intrinsic viscosity determined in benzene at 25° C. amounts to 0.38 dl./g.

(5) *Preparation of the Copolymer Methylmethacrylate and N-Vinylcarbazole by Solution Polymerization, the Polymerization Being Initiated by Free Radicals*

A solution of 12.5 g. of N-vinylcarbazole, 7.5 g. of methylmethacrylate, 100 cm.³ of benzene and 120 mg. of azo-isobutyronitrile in a three-necked flask of 250 cm.³, provided with a reflux condenser, is heated for 20 hours at 75° C. whilst nitrogen is passed through. After cooling, the mass is diluted with methylene chloride and poured into methanol. The formed precipitate is washed with methanol, filtered and dried.

(6) *Preparation of the Copolymer of Isobutylmethacrylate and N-Vinylcarbazole by Solution Polymerization*

A solution of 12.7 g. of isobutylmethacrylate, 17.3 g. of N-vinylcarbazole, 150 mg. of azo-bis-isobutyronitrile and 75 cm.³ of thiophene-free benzene is heated under nitrogen atmosphere for 6 h. at 75° C. This solution is then diluted with 60 cm.³ of methylene chloride and poured out into an excess of methanol. The precipitate formed is sucked off, washed with methanol and dried. N, percent found, 3.76, i.e., 51.8 mol percent of N-vinylcarbazole.

(7) *Preparation of the Graft Copolymer of Vinylcarbazole and Polyvinylbutyraldehyde Acetal by Polymerization in Solution, the Polymerization Being Initiated by Free Radicals*

A solution of 10 g. of Pioloform BL polyvinyl-n-butyral 20 g. of N-vinylcarbazole and 0.2 g. of azo-bis-isobutyronitrile in 11 g. of cyclohexanone is heated for 24 hours under nitrogen atmosphere at 75° C. The reaction mass is dissolved in 150 cm.³ of methylene chloride and precipitated in methanol. The formed precipitate is washed with methanol and dried. N, percent found, 4.6, i.e., 63.4 mol percent of N-vinylcarbazole.

The electrophotographic material according to the present invention comprises a suitable support provided with a photoconductive layer containing at least one of the polymeric substances containing or consisting of structural units according to the general formula given above, or mainly consisting of at least one of such polymeric substances.

For the preparation of the electrophotographic material according to present invention various techniques can be applied when coating the support with a photoconductive layer.

In practice, the polymeric substances involved, either alone or together with other additives such as those described more specifically hereinafter are preferably first dissolved or dispersed in a suitable organic solvent such as for instance benzene, acetone, methylene chloride, dioxane, dimethylformamide or glycol monomethylether, or in a mixture of two or more of such solvents. The solution or dispersion thus obtained is uniformly spread on a surface of a suitable support, for instance by centrifuging, spraying, brushing or coating whereafter the layer formed is dried in such a way that a uniform photoconductive layer is formed on the surface of the support. It is to be understood that the invention is not limited to the procedure of using the polymeric substances involved in the form of prepolymerized substances; for example monomeric or blends of monomeric and polymeric substances may be applied to the surface to be coated, and polymerized, condensed or cross-linked in situ by any of the methods well known in the art of polymer chemistry.

The thickness of the photoconductive layers is not critical, but is open to choice within a wider range according to requirements in each individual case. Good results are attained with photoconductive layers of a thickness between 1 and 20µ preferably between 3 and 10µ. Layers which are too thin do not have a sufficient insulating power and layers which are too thick require extensive exposure-times.

It has been stated that the photoconductive layers mainly consisting of polymeric substances containing or consisting of recurring units of the general formula given above, firmly adhere to the supports whereupon they have been applied.

The photoconductive layers according to the present invention may contain, besides one or more of the polymeric substances containing or consisting of structural units of the general formula given above, still one or more other photoconductive monomeric or polymeric compounds with similar or different photo-electric, mechanical or other physical properties.

In this way, it has been found that especially good results were obtained by using a mixture of one of the polymeric substances containing or consisting of structural units of the general formula given above, with photoconductive substances such as:

The imidazole, indole and oxazole derivatives;
The stilbene derivatives such as 4-nitro-4'-chlorostilbene;
The leuco diarylmethane derivatives;
Imidazo-(1,2-b)-1,2,4-triazine derivatives such as 3,6-diphenylimidazo-(1,2-b)-1,2,4-triazine and 2,3,6-triphenyl-imidazo(1,2,-b)-1,2,4-triazine;
Quinoxaline derivatives such as 2-(p-dimethylaminophenyl)-3-phenylquinoline and 6,7-diphenyl-2,4-dihydroxy pteridine;
1,2,3-triazole derivatives, such as 2-(p-sulphophenyl sodium salt)-naphtho[1,2-d]-1,2,3-triazole;
1,3,4-triazole derivatives such as those disclosed in D.R.P. 1,060,260;
Oxadiazole derivatives such as those disclosed in D.R.P. 1,058,836, such as, e.g.:
  2,5-di-(p-nitrophenyl)-1,3,4-oxadiazole;
  2,5-di-(p-aminophenyl)-1,3,4-oxadiazole, and further 1,4-di[2-(5-phenyloxadiazolyl)]benzene;
Other photoconductive substances, such as, e.g.:
  Fluorenene;
  N-ethylcarbazole-3-aldehyde;
  4-nitrofluoranthrene;
  Aminochrysene;
  Alizarin Rot (C.I. 58000);
  3,7-di(dimethylamino)thioxanthone-10;
  Brun Indigosol CRRE (C.I. 73411);
  Orange Indigosol HR (C.I. 73336);
  Vert Héliogène 5 G (powder consisting of a metal-free chlorinated phthalocyanine dye);
  p-Amino benzophenone;
  Tetracyan ethylene or with polymeric substances such as those disclosed in U.S. patent application, Serial No. 11,130, filed on February 26, 1960. In this respect favorable results are attained with layers consisting of 67 to 99% of the polymeric substances according to the present invention and 1 to 33% of one or more of the vinyl polymers or vinyl copolymers according to the application Serial No. 11,130 filed February 26, 1960.

Further, according to the present invention, compounds which themselves possess either or not photoconductive properties and which cause an increase of the general sensitivity and/or of the sensitivity to electromagnetic rays from a determined part of the spectrum can also be present in the photoconductive layers.

Suitable compounds for increasing the general sensitivity and/or the sensitivity to electromagnetic rays from the visible part of the spectrum are, e.g.:

Arylmethane dyestuffs such as. e.g.: Violet Fuchsine (C.I. 42510), Bleu Verdatre (C.I. 689), Vert Solide Nouveau 3 B (C.I. 42025), Erythrosine 2 Na (C.I. 773), Rhodamine B 500 (C.I. 45170), Fanal Pink B (C.I. 45160), Rhodamine 6 GDN (C.I. 45160), Auramin (C.I. 41000), Pyronin G (C.I. 45005).
Polymethine dyestuffs such as, e.g.: 3,3'-diethyl-thiacarbocyanine iodide,

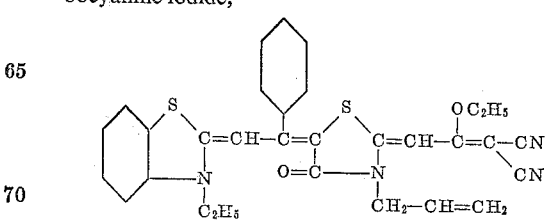

Azo-dyestuffs such as, e.g.: Eriochrome Blue Black R (C.I. 15705).
Azomethinedyestuffs such as. e.g.: bis(p-dimethylaminobenzal)-azine.

Carbonyl dyestuffs such as, e.g.: chloro-anil, Solway Ultra Blue B (C.I. 62055), Alizarine Cyaninegroen GWA (C.I. 61590).

Polycyclic compounds such as, e.g.: nitro-pyrene, N,N'-di(beta-naphthyl)-p-phenylene diamine, phenanthrene, anthracene, acenaphthene.

Heterocyclic compounds such as N,N'-pentamethylene-bis(benzthiazole)perchlorate.

Phthalocyanine dyestuffs such as, e.g.: Segnale hight turquoise NB (C.I. 74160).

Inorganic substances such as ammonium persulphate, potassium bromate and Sky Blue (C.I. 77368).

These compounds are preferably used in an amount of 0.1 to 5% in respect of the weight of the polymeric photoconductive substances used.

Finally, there can be present in the photoconductive layer other monomeric or polymeric compounds which confer the properties desired to the photoconductive layer and/or to the coating composition wherefrom this layer is formed.

In this way, plasticizers such as dibutylphthalate, dimethyl phthalate, dimethylglycolphthalate, tricresyl phosphate, triphenyl phosphate, monocresyldiphenyl phosphate etc. may be added to the polymeric substances used in the photoconductive layer in amounts of 10 to 30% of the polymer weight.

Other additives, well known in the art of coating technique, which may be used, include pigments, and agents controlling viscosity, free flow, aging and thermal stability, oxidation and/or gloss. In selecting such additives, preference is given to those substances which do not markedly impair the dark resistivity of the photoconductive layer.

In the manufacture of the electrophotographic material according to the present invention is preferably used as support for the photoconductive layer an electrically conductive plate or sheet, or an insulating plate or sheet provided with an electrically conductive layer. Under electrically conductive plate, sheet or layer is understood a plate, sheet or layer the specific resistivity of which is smaller than that of the photoconductive layer, i.e., in general smaller than $10^9$ ohm·cm. Supports the specific resistivity of which is smaller than $10^5$ ohm·cm. are preferably used.

Suitable insulating plates are, e.g., glass plates; these plates must be coated with a conductive layer, e.g., with a transparent layer of silver, gold or stannous oxide deposited thereon, e.g., by vacuum evaporation.

Suitable insulating sheets are for instance films of synthetic macromolecular substances with high specific resistivity such as for instance the polysylphonates described and claimed in the copending U.S. patent application Serial No. 797,587, filed March 6, 1959, polyesters such as those described and claimed in the copending U.S. patent applications Serial No. 702,252, filed December 12, 1957, Serial No. 725,498, filed April 1, 1958, Serial No. 731,874, filed April 30, 1958, polystyrene, polyethylene, cellulose esters etc. or sheets of paper with high specific resistivity. The insulating sheets must be provided with a conductive coating, e.g., with a thin metal sheet, with a layer comprising a metal powder dispersed in the smallest possible amount of binding agent, or with a thin hydrophilic layer comprising a hygroscopic and/or antistatic compound and a hydrophilic binding agent. Suitable hygroscopic and/or antistatic compounds are for instance glycerine, glycol, polyethylene glycols, calcium chloride, sodium acetate, condensation products of a maleic acid and polyethylene glycols, citric acid amides, hydroxypropyl sucrosemonolaurate, quaternary ammonium compounds such as Antistatin LF (trade name of Badische Anilin- & Soda-Fabrik A.G., Ludwigshafen (Rhine)), Arquad 16 and Ethoquad 18/25 (trade names of Armour and Company, Chicago, Ill.) amine salts of lyophilic alkylphosphates such as Zelec NK (trade name of E. I. du Pont de Nemours & Co. (Inc.), Wilmington, Del.), lyophilic dialkylpolyoxyalkylene phosphates such as Victawet 12 (trade name of Victor Chemical Works, Chicago, Ill.) and polyoxyalkyleneamides such as Ethomid HT/60 (trade name of Armour and Company, Chicago, Ill.). Suitable hydrophilic binding agents are for instance gelatin, glue, polyvinyl alcohol, methylcellulose, carboxymethylcellulose, cellulosesulphate, cellulose hydrogen phthalate, celluloseacetatesulphate, hydroxyethyl cellulose, polyacrylic acid or colloidal silica; for obtaining a good adhesion of the hydrophilic layer and the hydrophobic polymeric sheet, the polymeric sheet can be provided with a suitable subbing layer such as for instance one of the subbing layers described in the copending U.S. patent application Serial No. 509,333, filed May 18, 1955 (for polyester films), the British patent specification Nos. 819,592 and 865,123 (for films of polystyrene and substituted polystyrene), the copending patent application U.S. Serial No. 826,129, filed July 10, 1959, and the Belgian Patent No. 569,129 (for polyalkylene films), U.S.P. 2,867,542 (for cellulose ester films), and the Belgian Patent No. 573,005 (for hydrophilic layers with polyvinyl alcohol as binding agent).

Suitable conductive plates are for instance plates of metals such as aluminum, zinc, copper, tin, iron or lead.

Suitable conductive sheets are for instance films made of polymeric substances with low specific resistivity such as for instance polyamide films or paper sheets with low specific resistivity. Good results can be attained by using paper sheets containing hygroscopic and/or antistatic substances as described hereinbefore. These hygroscopic and antistatic substances are preferably incorporated into the paper sheets during the paper manufacturing process either by adding them to the paper pulp or by an after-treatment, before or after calendering the paper sheets. These substances can likewise be incorporated into the paper sheets by applying to the raw paper stock a composition containing the hygroscopic and/or the antistatic substances and a hydrophilic binding agent as described hereinbefore.

It was likewise stated that particularly good results are attained when using paper sheets with low specific resistivity provided with a coating of a polymeric substance in order to obtain a smooth surface and to prevent the organic liquid wherein the photoconductive substance is dissolved from penetrating within the paper sheet. This coating, however, must not prevent the carrying-off of the electrons from the exposed image areas during the irradiation. Suitable coatings are for instance coatings with a thickness of 2 to $10\mu$ and composed of one or more of macromolecular compounds such as, e.g., natural resins, such as dammar resin, elemi-resins, gum arabic, manilla gum and sandarac resin; micro-crystalline waxes; modified natural substances such as cellulose diacetate and cellulose triacetate, cellulose acetobutyrate, ethyl cellulose, ethyl cellulose stearate or other cellulose derivatives pentaerythrite polyesters or other modified colophonium resins and ester gums; polymerisates such as polyethylene, polystyrene and copolymers of styrene, polyvinylacetate and copolymers of vinylacetate, polyvinylacetals of formaldehyde, acetaldehyde, butyraldehyde, polyacrylic acid esters and polymethacrylic acid esters and coumarene-indene resins; and polycondensates such as glycerol-phthalate resins and other glyceryl polyesters, alkyd resins, polyethylene glycol esters, diethylene glycol polyesters, formaldehyde resins and silicone resins. If desired plasticizers can be added such as for instance dibutylphthalate, dimethylphthalate, dimethylglycol phthalate, tricresylphosphate, triphenylphosphate and monocresyldiphenylphosphate etc. Especially good results were attained when using polysulphonates such as those described in the copending U.S. patent application Serial No. 797,587, filed March 6, 1959, and the polyesters disclosed in the copending U.S. patent applications Serial No. 702,252, filed December 12, 1957, Serial No.

725,498, filed April 1, 1958, Serial No. 731,874, filed April 30, 1958.

Besides the usual paper sorts can likewise be used synthetic paper sorts as those prepared from polyester fibers, from terephthalic acid and glycols, from polyamide fibers, from nylon fibers or from polyacrylonitrile fibers. Before coating the photoconductive layers on such paper sheets, the latter are preferably impregnated with substances enhancing their conductivity, for instance polycaprolactam, the polyester of 2,5-di-(p-oxyphenyl)-1,3,4-oxadiazole and 1-chloro-3-aminobenzene-4,6-disulphochloride, a copolyamide of hexamethylenediamine, caprolactam, adipic acid and sebacic acid, N-methylene polyhexamethylene adipamide or polyamides such as Ultramid 1 C (a co-polyamide of hexamethylene diamine, 4,4'-diamino dicyclohexylmethane, caprolactam and adipic acid).

Electrophotographic materials according to the present invention can be used in any of the different techniques whatever which are based on the exposure and the discharge of an electrostatic charge provided in or on a photoconductive layer.

The electrostatic charging of the photoconductive layer according to the present invention can be effected according to one of the methods known in electrophotography, for instance by friction with a smooth material, by friction with a material possessing a high electric resistivity such as for instance a cylinder coated with polystyrene, by corona discharge, by contact charge or by discharge of a capacitor. A positive charge applied at the rear side of the printing material gives about the same result as a negative charge at the front side.

The electrophotographic material is thereafter imagewise exposed to a suitable electromagnetic radiation whereby the radiated parts of the layer are image-wise discharged and an electrophotographic latent image is obtained. The electrostatic latent image formed is then converted into a visible image either on the electrophotographic material whereon the latent image was formed, or on a material onto which the electrostatic latent image was transferred for instance by application of the method as described in the Belgian Patent No. 529,234.

The conversion of the original or transferred latent image into a visible image can occur according to one of the techniques known in electrophotography wherein use is made of the electrostatic attraction or repulsion of finely divided colored substances which for instance are present in a powder mixture, in an electric insulating liquid (for instance in the form of suspension) or in a gas (for instance in the form of aerosol), or of finely divided colored liquid drops which are for instance present in an electrically insulating liquid (for instance in the form of dispersion) or gas (e.g., in the form of aerosol).

By suitable choice of the sign of the charge of the developing powder or developing liquid a negative or positive print can be obtained at will from any original. If both the printing material and developing powder or developing liquid bear the same charge sign, the powder will only adhere to the discharged areas and a print (positive/positive) is obtained with the same image value as the original. If the sign of the material and of the developing powder or developing liquid is different, the image values become reversed (negative/positive).

Besides development according to the methods generally known in electrophotography, also other techniques can successfully be used for instance by applying the method according to the copending patent application Serial No. 856,357, filed December 1, 1959, and the copending patent application Serial No. 741,017, filed June 10, 1958.

If a colored powder was used for making visible the latent image, the visible image obtained can, if necessary, be fixed according to one of the methods known in electrophotography, e.g., by heating, or it can be transferred onto another support, for instance according to the method described in the British Patent 658,699 and fixed thereon.

Evidently, the present invention is by no means limited to one or the other particular embodiment as regards the use of the new electrophotographic materials, and the exposure technique, the charging method, the transfer (if any), the developing method, and the fixing method as well as the materials used in these methods can be adapted to the necessities.

Electrophotographic materials according to the present invention can be applied in reproducing techniques wherein different kind of radiations, electromagnetic radiations as well as nuclear radiations are used. For this reason, it should be pointed out that although the invention is mainly intended for being applied in connection with methods comprising an exposure, the term "electrophotography" wherever appearing in the description and the claims, must be broadly understood and comprises both xerography and xeroradiography.

The followng examples illustrate the present invention without limiting, however, the scope thereof.

*Example 1*

A 60 g./sq. m. aluminum paper which is coated with an aluminum sheet of a thickness of 30μ is further coated with a layer from the following solution:

Poly(N-propenylcarbazole) (prepared as described hereinbefore) _____ g__ 10
Bleu Zapon Solide 3 G (C.I. 51005) _____ mg__ 12
Methylene chloride _____ cm.$^3$__ 80
Tetrahydrofurane _____ cm.$^3$__ 20

The dried layer has a thickness of 5μ and adheres very well to the support. The material obtained is negatively charged with a corona at a 7500 volt tension, and exposed through a microfilm negative. A linear 4× enlargement requires an exposure time of 2.5 seconds. The latent image obtained is made visible by dusting with a developing powder consisting of 100 parts of glass beads and 5 parts of a coloring powder prepared by grinding 2 g. of pitch, 5 g. of colophonium and 1.5 g. of carbon black in a ball mill for 4 hours and heating whilst stirring in a stainless steel beaker until the mass has melted homogeneously. After cooling, the solidified mass is ground again in a ball mill until at least 80% of the grains pass through a sieve with meshes of 50μ. This fine coloring powder is then mixed with glass beads in a 5/100 proportion. The image obtained is strong, sharp and clear.

*Example 2*

A 70 g./sq. m. paper stock is coated with a baryta layer containing for 10 parts of barium sulphate, 1 part of gelatin and 1 part of glycerine. After calendering, this baryta layer has a thickness of 10μ. This material is dip-coated in the following solution:

Poly(N-propenylcarbazole) (prepared as described hereinbefore) _____ g__ 6
Vinylite VAGH (a copoly [vinylchloride/vinylacetate/vinylalcohol] (91/3/6) composition date Schildknecht "Vinyl and Related Polymers" (1952), John Wiley & Sons, New York, U.S.A.) _____ g__ 4
Methylene chloride _____ cm.$^3$__ 100
Rhodamine B 500 solution 1% (C.I. 45170) in dimethyl formamide) _____ cm.$^3$__ 10

After drying, the layer has a thickness of 9μ.

After negative charging with a corona the electrophotographic layer is reflectographically exposed with an original printed on both sides. For this purpose a light source of 100 watts at 10 cm. distance requires an exposure time of 3 seconds. The latent image obtained is developed with the powder described in Example 1. The counterpart image obtained is in known way electrostatically transferred onto a sheet of writing paper and fixed by exposing this paper for 10 seconds to trichloroethylene vapors. A strong, readable, positive image is obtained.

*Example 3*

A 90 g./sq. m. paper stock coated with a polyvinyl acetate layer having a thickness of $4\mu$ is dip-coated in the following solution:

| | |
|---|---|
| Poly(N-propenylcarbazole) (prepared as described hereinbefore) _____ g__ | 150 |
| Chloroform _____ l__ | 1 |
| Induline Scarlet (C.I. 50080) solution 1% in dimethylformamide _____ cm.$^3$__ | 22 |

After quick drying with warm air, the layer thickness amounts to $7\mu$. After negative charging with a corona at a high tension, the material obtained is exposed for 4 seconds with a 100 watt lamp at 10 cm. distance through a paper sheet printed on one side. Development of the latent image obtained is carried out by superficially moistening the exposed electrophotographic layer with a dispersion of 1 g. of Bellacolour blue (trade name for a blue printing ink manufactured by Jänecke und Schneemann K.G. Druckfarbenfabrik, Hannover) in petrol. The image obtained is very sharp and strong.

*Example 4*

An unbrushed aluminum sheet is coated with a layer from the following solution:

| | |
|---|---|
| Poly(N-phopenylcarbazole) (prepared as described hereinbefore) _____ g__ | 5 |
| Nostalit CAM (a copoly[vinylchloride/vinylacetate/maleic anhydride] (85/14/1)) _____ g__ | 5 |
| Rhodamine B (C.I. 45170) _____ mg____ | 10 |
| Methylene chloride _____ cm.$^3$__ | 100 |

The dry layer has a thickness of $5\mu$ and adheres very well to the support also if the material is sharply folded. This material is then negatively charged with a corona and exposed for 1 second through a diapositive with a 100 watt lamp at a distance of 10 cm. The latent electrostatic image obtained is now developed by dusting with the following powder mixture: 100 parts of iron powder and 6 parts of the toner which is described on page 11 of the Belgian patent specification 535,951. A strong positive image from the original is formed. After fixing this image by heat, the exposed image parts are removed with a mixture of 6 parts of ethyl acetate and 4 parts of acetone. After moistening the aluminum surface with a solution of 1 g. of sodium hydroxide and 1 g. of ethylene diamine sodium tetra-acetate in 100 cm.$^3$ of water, an offset plate is obtained which is ready to be braced on the offset machine.

*Example 5*

A sheet of Mylar (a polyester film made from poly[ethylene terephthalate]) having a thickness of $20\mu$ and coated by vacuum evaporation with an aluminum film of a thickness of $2\mu$ is roller-coated with a solution of the following composition:

| | |
|---|---|
| Poly(N-propenylcarbazole) (prepared as described hereinbefore) _____ g__ | 12 |
| Methylene chloride _____ cm.$^3$__ | 100 |
| 1-ethyl-4-[β-(3,N-ethylcarbazyl)-vinyl]-quinolinium iodide _____ mg__ | 20 |

Coating is done at a speed of 8 m./min. By an intensive drying with a warm air current, a too strong attack of the Mylar film by the solvent of the coating layer is avoided. The dried layer has a thickness of $7\mu$. After negative charging, an exposure time of 1.2 seconds with a 100 watt lamp at a 10 cm. distance is required. By development with the powder mixture described in Example 4 a strong reproduction of the original is obtained.

*Example 6*

On the aluminum foil laminated onto a paper stock, the following solution is dip-coated:

| | |
|---|---|
| Poly(N-allylcarbazole) (prepared as described hereinbefore) _____ g__ | 5 |
| Mostalit CAM (registered trademark) _____ g__ | 5 |
| Methylene chloride _____ cm.$^3$__ | 100 |
| 1% solution of Rhodamine D (C.I. 45170) in dimethylformamide _____ cm.$^3$__ | 1 |

The dried layer has a thickness of $8\mu$. After charging the material obtained with a negative corona, it is exposed for 2.5 seconds, through a transparent original with a 100 watt lamp at a distance of 10 cm. After dusting with a colored powder in known way, a clear reproduction is obtained.

*Example 7*

The surface of a hollow aluminum cylinder is slightly roughened by sand-blasting, thoroughly degreased and coated with the following mixture:

| | |
|---|---|
| Monomeric N-vinylcarbazole _____ g__ | 200 |
| Methylene chloride _____ cm.$^3$__ | 1000 |
| Azo-bis-isobutyronitrile _____ g__ | 2 |

After drying, the cylinder is placed in an oven in an atmosphere of nitrogen. The temperature is now raised in two hours to 120–130° C. and maintained for 15 hours. The polymerized coating has a thickness of $5\mu$. After cooling, the cylinder is perfectly suitable as an image carrier in electrophotographic printing apparatus, onto which after charging, an image may be projected, developed and transferred to a suitable reception material.

*Example 8*

The same procedure is followed as described in Example 7, but instead of a hollow aluminum cylinder, a flat aluminum sheet is used. It is to be noted that the layer of poly(N-vinylcarbazole) obtained in this way by polymerization in situ on the aluminum sheet firmly adheres to the aluminum sheet, so that the aluminum sheet bearing the poly(N-vinylcarbazole) layer can be folded sharply without deterioration of the photoconductive coating, whereas in such circumstances deterioration easily occurs if a solution of the preformed polymer is applied to the aluminum sheet.

*Example 9*

A 90 g./sq. m. paper stock is coated with a baryta layer containing 10 g. of barium sulphate per sq. m. Four strips (A, B, C and D) of this paper are coated with a layer from a solution containing 10 g. of poly-(N-vinylcarbazole) dissolved in 100 cm.$^3$ of methylene chloride, whereby for each strip a poly(N-vinylcarbazole) from different origin is used:

Strip A: Luvican M 170 (a poly[N-vinylcarbazole]).
Strip B: poly(N-vinylcarbazole) prepared by emulsion polymerization as described hereinbefore.
Strip C: poly(N-vinylcarbazole) prepared by polymerization in solution with $P_2O_5$ as catalyst, as described hereinbefore.
Strip D: poly(N-vinylcarbazole) prepared by polymerization in solution with sulphuric acid as catalyst, as described hereinbefore.

Each of these strips is negatively charged with a corona at high tension, and exposed through a diapositive to a 100 watt lamp at 10 cm. distance for different periods of time, varying from 1 sec. to 5 min.

The latent images obtained are rendered visible by dusting with a developing powder as described in Example 4 and fixing by heating.

It is to be noted that for strips C and D the minimum exposure time was only 1.5 sec., whereas for strips A and B this minimum exposure time was 5 min.

Example 10

A 90 g./sq. m. paper stock is coated with a baryta layer containing for 10 parts of barium sulphate one part of gelatin and one part of glycerine. After drying this layer, the following solution is dip-coated thereon:

| | | |
|---|---|---|
| Copolymer of N-vinylcarbazole and ethylacrylate (prepared by polymerization in solution as described hereinbefore) | g | 10 |
| Rhodamine B (C.I. 45170) | mg | 10 |
| Methylene chloride | cm.$^3$ | 70 |
| Toluene | cm.$^3$ | 30 |

The dried layer has a thickness of 8μ. The material obtained is negatively charged by means of a corona at a high tension. Then a microfilm image is projected onto the electrophotographic layer. A linear 4× enlargement requires an exposure time 1 minute with a 75 watt lamp. The latent image obtained becomes visible by means of a powder mixture consisting of 100 parts of iron powder and 5 parts of the following color powder: 5 parts of colophonium, 2 parts of pitch and 2 parts of carbon black are homogenized together for 2 hours in a ball mill, heated whilst stirring to a uniform pulp, cooled again and ground another time until at least 80% of the finely ground particles sizes less than 150μ. The image obtained is very strong and clear.

Example 11

A 90 g./sq. m. paper stock is dip-coated with the following solution:

| | | |
|---|---|---|
| Copolymer of N-vinylcarbazole and methylacrylate | g | 90 |
| Chloroform | cm.$^3$ | 1000 |
| Brilliant Glacier Blue (C.I. 42140) | g | 0.35 | and quickly dried. The dried layer has a thickness of 8μ. The material obtained is negatively charged by means of a corona at 400 volts and exposed for 2 seconds through a diapositive with a 100 watt lamp at 10 cm. distance. Next, the latent image formed is developed by immersing the material for 2 seconds into a dispersion of 1 g. of Bellacolor Blue (registered trade name) in 1 litre of hexane whereby a strong print of the original is obtained.

Example 12

A 90 g./sq. m. paper stock, coated with a 10 g./sq. m. baryta layer is further coated with the following solution:

| | | |
|---|---|---|
| Copolymer of N-vinylcarbazole and n-butylacrylate | g | 12 |
| Methylene chloride | cm.$^3$ | 100 |
| Bleu Basique pour Cuir N 2 B (C.I. 51195) | mg | 50 |

After quick drying with the infrared lamps, the layer obtained has a thickness of 7μ. This coated material is treated in the same way as in Example 1 and yields a good print of the original with an exposure time of 2.5 seconds.

Examples 13–23

Similar results as in the preceding Example 12 are obtained by substituting the following combinations of copolymers and sensitizing dyestuffs for the combination used in Example 12:

(13) Copolymer of N-vinylcarbazole and acrylonitrile-Rhodamine G (C.I. 45150).
(14) Copolymer of N-vinylcarbazole and isopropenyl acetate Bleu Basique pour Cuir N 2 B (C.I. 51195).
(15) Graft copolymer of N-vinylcarbazole and the terpolymer of vinyl-chloride, vinyl acetate and maleic anhydride-Brilliant Glacier Blue (C.I. 42140).
(16) Graft copolymer of N-vinylcarbazole and polyethylacrylate-1-amino-anthraquinone.
(17) Graft copolymer of N-vinylcarbazole and the terpolymer of vinylchloride, vinyl acetate and vinyl alcohol-tetracyanoethylene.
(18) Copolymer of N-vinylcarbazole and 3,3',5-trimethylisonoylether Monastral Fast Green GS powder (C.I. 74260).
(19) Copolymer of N-vinylcarbazole and vinylcinnamate-Rhodamine 6 GH extra (C.I. 45160).
(20) Copolymer of N-vinylcarbazole and laurylmethacrylate-Rhodamine B (C.I. 45170).
(21) Graft copolymer of N-vinylcarbazole and polystyrene-Victoria Blue (C.I. 44045).
(22) Copolymer of N-vinylcarbazole and vinylstearate-Monastral Fast Blue BVS Paste (C.I. 74160).
(23) Copolymer of N-vinylcarbazole and N-vinylpyrrolidone-Rhodamine B (C.I. 45170).

Example 24

A photographic baryta paper is coated with a layer of the following solution:

| | | |
|---|---|---|
| Copolymer of N-vinylcarbazole and ethylacrylate (prepared by emulsion polymerization as described hereinbefore) | g | 10 |
| Methylene chloride | cm.$^3$ | 100 |

The dried layer has a thickness of 8μ and has a mat appearance and this electrophotographic material is therefore very suitable for application in the field of document reproduction. After negative corona charging, the material obtained is reflectographically exposed to an original having an image on both sides. For this purpose an exposure time of 4 seconds is required with a 100 watt lamp at 10 cm. distance. The latent image formed is made visible by dusting with a powder mixture consisting of 100 parts of iron powder and 5 parts of the toner which is described on page 11 of the Belgian patent specification 535,951. The powder image obtained is electrostatically transferred in known way onto writing paper and on this paper fixed by heat to obtain a clear readable copy. By addition of 15 mg. of Bleu Zapon Solide 3 G (C.I. 51005) to the abovementioned solution the exposure time is reduced to one-half.

Example 25

Baryta paper is coated with a layer from the following solution:

| | | |
|---|---|---|
| Graft copolymer of N-vinylcarbazole and butyraldehyde acetal of poly(vinylalcohol) (prepared as described hereinbefore) | g | 10 |
| 1-chloroanthraquinone | g | 0.1 |
| Methylene chloride | cm.$^3$ | 100 |

The dry layer has a thickness of 7μ. When treated as in the foregoing example this material yields a very strong print after 3 seconds of exposure.

Example 26

A 70 g./sq. m. paper stock is coated with a baryta suspension containing for 10 parts of barium sulphate one part of gelatin and one part of glycerine. After calendering, this baryta layer has a thickness of 10μ, and the following solution is dip-coated thereon:

| | | |
|---|---|---|
| Copolymer of 2-ethylhexylacrylate and N-vinyl carbazole | g | 10 |
| Tetrahydrofurane | cm.$^3$ | 100 |
| Fuchsine Kiton G | mg | 12 |

After drying the layer obtained has a thickness of 9μ. If now this material is treated in the same way as Example 11 with an exposure time of 4 sec. a perfect print is obtained.

Example 27

On a 120 g./sq. m. photographic baryta coated paper is further coated the following layer:

| | | |
|---|---|---|
| Copolymer of isobutylmethacrylate and N-vinylcarbazole (prepared as described hereinbefore) | g | 10 |
| Methylene chloride | cm.$^3$ | 100 |
| Nile Blue BB (C.I. 51185) | mg | 10 |

The dried layer has a thickness of 8µ and requires after charging an exposure time of 3 seconds with a 100 watt lamp at 10 cm. distance for copying a transparent original. The exposed material is further developed as in Example 10.

*Example 28*

The following solution is coated on baryta paper stock:

| | |
|---|---|
| Copolymer of methylmethacrylate and N-vinylcarbazole (prepared as described hereinbefore)__g__ | 90 |
| Methylene chloride _____cm.³__ | 900 |
| Dioxane _____cm.³__ | 100 |
| Rhodamine B, 1% solution in methyl glycol__cm.³__ | 20 |

After drying, a smooth layer with a thickness of 7µ is obtained. After charging, this layer is exposed through a negative for 5 seconds to a tungsten lamp of 100 watt at a distance of 30 cm. After powder development, a clear copy is obtained.

*Example 29*

The following solution is coated on a baryta paper stock:

| | |
|---|---|
| Polystyrol EH (a copoly[styrene/acrylonitrile/N-vinylcarbazole] (50/30/20))_____g__ | 10 |
| Methylene chloride _____cm.³__ | 100 |

After drying, a layer is obtained with especially good mechanical and electrophotographic properties (such as, e.g., tensile strength, resp. sensitivity) which are much better than those of the layers obtained by using a mixture containing 40% polystyrene, 30% polyacrylonitrile and 20% poly(N-vinylcarbazole).

We claim:

An electrophotographic copying process which comprises exposing an electrostatically charged photoconductive insulating layer comprising a copolymer of 59% by weight N-vinyl carbazole and 41% by weight vinyl butyral to a light image whereby the light struck area is discharged and developing said image of electrostatic charges with an electroscopic material.

References Cited in the file of this patent

UNITED STATES PATENTS

| | | |
|---|---|---|
| 2,072,465 | Reppe et al. | Mar. 2, 1937 |
| 2,709,140 | Michalek | May 24, 1955 |
| 2,860,048 | Deubner | Nov. 11, 1958 |
| 3,037,861 | Hoegel et al. | June 5, 1962 |

FOREIGN PATENTS

| | | |
|---|---|---|
| 201,416 | Australia | Apr. 13, 1956 |
| 1,068,115 | Germany | Oct. 29, 1959 |

OTHER REFERENCES

Metcalfe et al.: Oil and Colour Chem. Assn., vol. 39, No. 11, pages 845–856 (1956) (page 845 relied on).